United States Patent [19]

Dunster et al.

[11] 4,130,146

[45] Dec. 19, 1978

[54] VISUAL LEVEL INDICATOR

[76] Inventors: Ronald A. Dunster, 36 S. Whittier St., Carteret, N.J. 07008; John A. Savage, 1111 Crandon Blvd., Key Biscayne, Fla. 33149

[21] Appl. No.: 799,609

[22] Filed: May 23, 1977

[51] Int. Cl.² .............................................. B65B 3/26
[52] U.S. Cl. ..................................... 141/96; 141/198; 141/383
[58] Field of Search .................. 73/308, 322; 137/412; 141/59, 94, 95, 96, 198, 199, 212, 219, 220, 227–229, 346, 347, 392, 383

[56] References Cited

U.S. PATENT DOCUMENTS

| 423,577 | 3/1890 | Siersdorfer | 141/96 |
| 1,779,869 | 10/1930 | Andreasen | 141/96 |
| 2,130,059 | 9/1938 | Bosh et al. | 141/383 X |
| 2,811,179 | 10/1957 | Greenwood | 141/95 |
| 3,605,824 | 9/1971 | Madden et al. | 141/59 X |

Primary Examiner—Richard E. Aegerter
Assistant Examiner—Frederick R. Schmidt
Attorney, Agent, or Firm—Joseph P. Nigon

[57] ABSTRACT

A system for allowing an operator to accurately observe the liquid level in a tank truck or transport trailer that is filled from a bulk storage tank through a flange on the line from the storage tank that is attached to a matching flange of the tank truck or transport trailer by incorporating a float gauge structure into the flange on the line from the storage tank, thus, enabling the operator to accurately observe the level of the liquid in the tank truck or transport trailer and manually shut off the flow from the storage vessel when the tank truck or transport trailer contains the desired amount of liquid. The system includes sensors designed to indicate sealed engagement of the flange on the line from the storage tanks with the matching flange on the tank truck or transport trailer.

4 Claims, 2 Drawing Figures

VISUAL LEVEL INDICATOR

BACKGROUND OF THE INVENTION

Distribution of many liquid products, in particular petroleum products such as gasoline and fuel oil, from a bulk storage plant to retail operations for consumers is accomplished by means of tank trucks or transport trailers. These vehicles are filled with a liquid by various methods, one of which is called top loading.

In top loading the vehicle is positioned next to a loading rack which is equipped with a system for transferring the liquid products from the storage tank to the tank truck or transport trailer. These systems generally comprise what is known as a loading arm which consists of a boom that is pivotally connected to the storage tank and can be moved about the pivot to attach the flange at the end thereof to the mating flange on the truck or transport trailer.

In this operation the operator of the vehicle climbs on top of the vehicle, opens the manhole, and swings the loading arm into position over the flange on the manhole. Under the old method of top loading, the diameter of the nozzle attached to the line on the loading arm that extended into the manhole was considerably smaller than the diameter of the manhole so that the operator could observe the level of the liquid rising within the vessel as he loaded and could control his inputs so as to obtain a maximum capacity of the vessel without overfilling.

In recent years there has been a considerable change in this method due to the regulations of the Environmental Protection Agency regarding air pollution. At present, the boom and flange system includes a vapor recovery system that insures that no vapor from the gasoline or other volatile liquid supplied to the tank truck or transport trailer is released into the atmosphere.

These devices differ in design. One of the most common is a structure in which the vapor return head is mounted on the end of the loading arm as part of a plate which seals off the flange in the manhole in the tank to be filled. The sealing of the manhole prevents the operator from observing the liquid level in the vessel as he is loading. A preset meter system has been used in an attempt to solve this problem. In addition, various complex electronic and pneumatic systems have been devised to prevent the tank truck or transport trailer from being overfilled and still permit the vehicle to be loaded to full capacity.

These systems require complex electrical or pneumatic installations at the loading rack and also require explosion-proof equipment. Automatic control valves or preset meters may also be installed to operate in conjunction with the overfill prevention equipment.

The preset meter system is unsatisfactory in that, if the operator underestimates the volume of liquid contained in the vessel before loading operation begins, he runs the risk of overfilling his tank. If he overestimates the liquid present in the vessel, he will underfill the tank and proceed on his delivery route with less than a full tank of liquid.

A control device such as the electronic liquid lever senser that will automatically shut off the valve and not permit any more liquid to fill the tank also has certain inherent disadvantages. If the device malfunctions, the operator would have no way of knowing that the tank is full and would still run the risk of overfilling. If, on the otherhand, the control device malfunctions in the closed position, it will shut down his operation until the control device can be bypassed.

The present invention satisfactory overcomes this problem by permitting the operator to observe the liquid level in the tank so that overfilling can be prevented, and yet the tank can be loaded to full capacity.

An object of the invention is to provide a visual level indicator system that is a simple mechanical device which does not require extensive electrification, pneumatic operation, or complex explosion-proof integrity at the loading rack.

It is another object of the invention to provide a mechanical system that is much less complex than the electronic systems and one that is less subject to malfunction.

It is another object of the invention to provide a system that will permit the operator to load his vessel even in the event of a malfunction.

THE INVENTION

The present invention provides a method of filling a tank truck or transport trailer from a storage tank that allows the truck operator to be fully appraised of the amount of liquid in the tank at any time during the filling process. The device consists of a visual level indicator system that is integral with the flange attached to the boom of the supply tank. The device allows the operator to observe the level of the liquid in the tank to prevent overfilling and to guard against underfilling the tank of the tank truck or transport trailer. The device includes sensors that prevent the flow of gasoline or other fluid into the tank truck or transport trailer until the seal between the gasket, attached to the delivery flange, and the flange on the tank truck or transport trailer is tight.

PREFERRED EMBODIMENT OF THE INVENTION

The invention is more clearly understood with reference to the following detailed specification read in conjunction with the drawings wherein —

Figure 1:
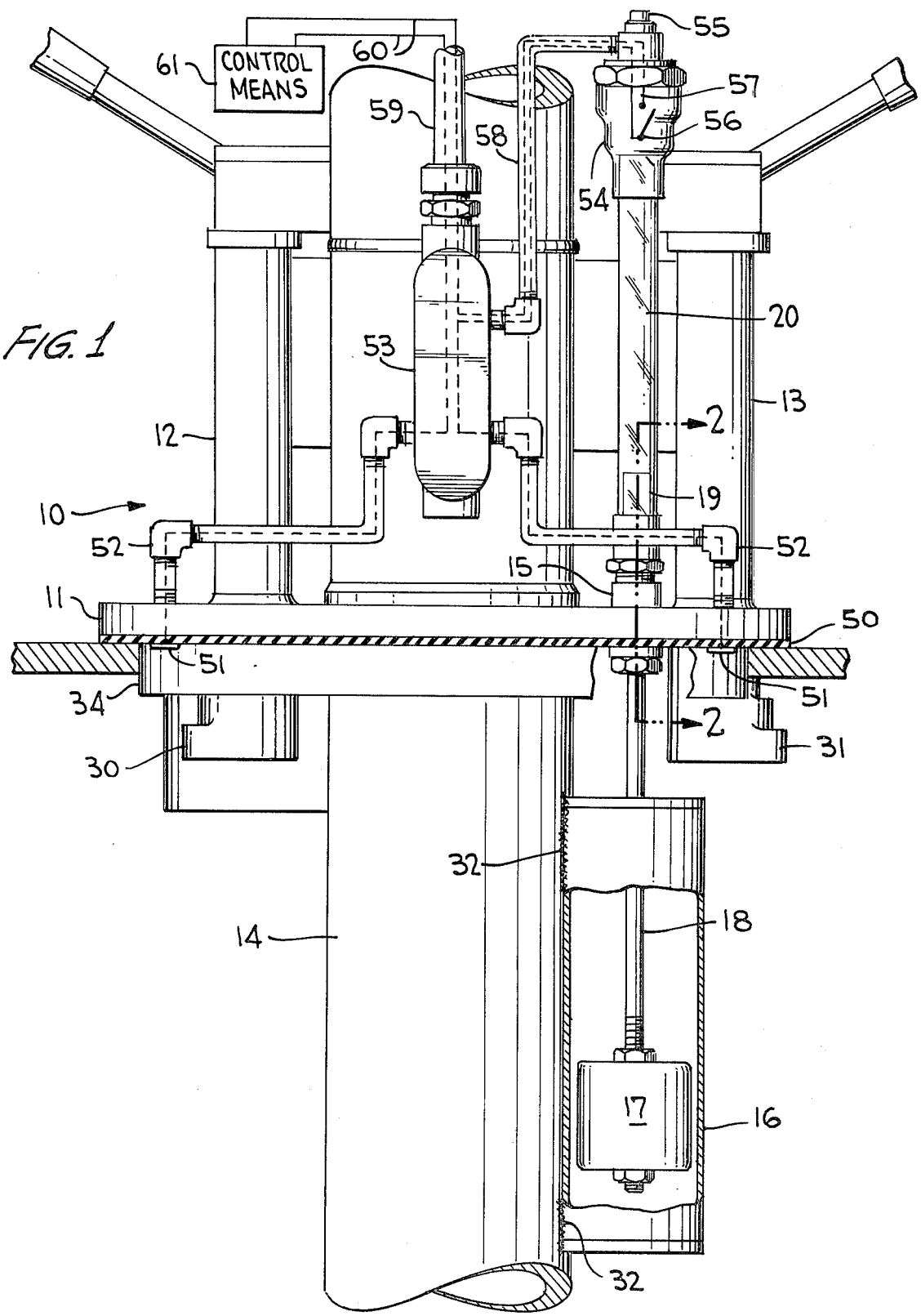
FIG. 1 is a side view of one embodiment of the invention.

Referring now to FIG. 1, there is shown a structure 10 consisting of a plate weldment 11, flange 34, and gasket 50 that is designed to fit onto the flange in the manhole of a tank trailer and has handle assemblies 12 and 13 rotatably mounted in the plate weldment 11 and flange 34 that are designed to attach the structure and gasket 50 to the flange in the manhole of the tank truck. Intrinsically safe sensors 51 are positioned in the gasket 50 and are connected through wiring in electrical conduit 52 through junction box 53 to control means 61. This system prevents flow of gasoline or other fluid into the tank trucks until the seal between the gasket 50 and the flange of the tank truck or transport trailer is tight. The device includes a drop tube 14 extending through the plate weldment 11. The plate weldment contains an integral boss 15 which supports the visual level indicator. The visual level indicator consists of a shroud 16 welded to the drop tube 14 by the weld 32. A float 17 is attached through a stainless float rod 18 to a highly colored indicator 19 positioned in a sight tube 20.

A sealed cap 54 is positioned over the sight tube 20. This cap may optionally contain an intrinsically safe switch 56, 57. The cap is equipped with a tamper-proof seal 55. When present, the intrinsically safe switch system consists of a pair of contacts 56 and 57 connected through wiring 59 in conduit 58 to the junction box 53 and then to the control means 61. The electrical system in control means 61 turns off the flow of gasoline or other liquid to the tank truck or transport trailer in the event that the individual operating the system is inattentive and element 19 causes the contacts 56 and 57 to close and activate the switch.

The electrical components of the control means are not part of this invention. Any electrical system that gives the desired result can be used in this control means.

Figure 2:
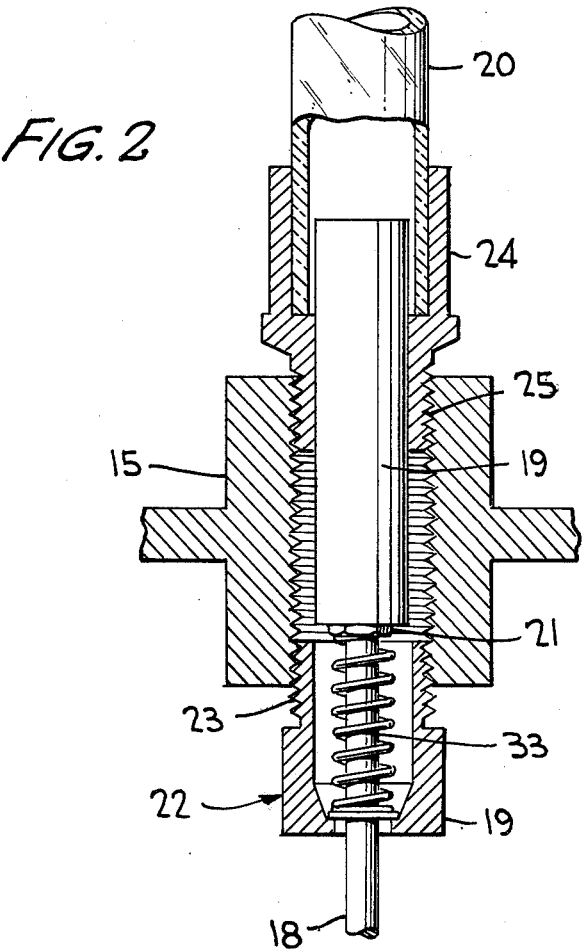
FIG. 2 is a view along the lines 2—2 of FIG. 1 and shows the details of a portion of the structure.

Referring now to FIG. 2 which is a section taken along line 2—2 of FIG. 1 and shows details of the mounting of the visual level indicator in the structure. The stainless steel float rod 18 is attached to the highly colored indicator 19 through a snubber spring 33 disposed concentrically around the stainless steel float rod. This spring tends to retard the downward movement of the indicator. The float rod and snubber spring are positioned in the guide bushing 22 which is attached by means of threads 23 to the plate weldment boss 15. The sight tube 20 is attached to the plate weldment boss 15 by means of a flange 24 through thread means 25.

In operation of the system a truck operator climbs on top of the truck and removes the manhole cover (not shown) and exposes the flange of the tank (not shown). He then swings over the loading arm (not shown), which includes the structure 10. The structure 10 is attached to the flange in the manhole by rotating the handles 12 and 13 to secure the plate weldment 11, the flange 34, and the gasket 50 onto the flange of the tank truck (not shown) by means of protrusions 30 and 31. These handle assemblies assure a tight seal between the plate weldment 11 and the flange in the tank truck or transport vehicle. The sensors 51 prevent flow of the fluid through the system until the seal between the flange 34, gasket 50, and the flange on the tank truck is tight.

The tank is then filled by opening the valve (not shown) and allowing the liquid to pass through the drop tube 14 into the tank. As the tank fills, the liquid level rises causing the float 17 to move upwardly and exposing progressively larger portions of the indicator 19 which is contained in the sight tube 20 which is preferably of a clear plastic material. The level indicator is colored a very bright color such as ruby red so that the operator can visually monitor the filling of the tank and can cut off the supply to the tank when it is filled as is indicated by the position of the indicator. If the optional secondary indicator system is included in the seal cap 54 and if the indicator 19 causes the contacts 56 and 57 to meet, the flow of gasoline or other fluid into the tank truck is cut off.

The tank truck operator then disconnects the assembly by rotating the right and left hand handles and moving the assembly upwardly and away from the tank of the truck. He then replaces the manhole cover on the tank and the operation is complete.

The visual level indicator thus permits the operator to observe the liquid level in the tank so overfill can be prevented and yet the vessel can be loaded to full capacity. This function is accomplished by a mechanical device which doesn't require extensive electrification, pneumatic apparatus, or explosion-proof integrity at the loading rack. The visual level indicator by itself is not a control apparatus. It does not automatically shut off the inlet valve when the liquid level has approached the full point and is, therefore, much less subject to malfunction.

The secondary indicator system may optionally be included in the sight cap to prevent overfilling if the operator is inattentive and fails to cut off the flow to the tank truck or transport trailer when the level in the tank causes the element 19 to contact and close the switch elements 56 and 57.

Obviously, many modifications and variations of the invention may be made without departing from the essence and scope thereof and only such limitations should be applied as are indicated in the appended claims.

What is claimed is:

1. A coupling apparatus for use in a system for transferring liquids from a storage tank to the tank of a vehicle wherein the tank of the vehicle has an upwardly facing horizontal manhole means, comprising:
   (a) a plate;
   (b) said plate having a downwardly extending annular flange having a diameter whereby said flange may fit into said manhole with a relatively snug fit;
   (c) said plate having at the underside thereof an annular gasket and external of said flange whereby said gasket at the otherside thereof is in confronting relationship with an edge portion of said manhole means when the apparatus is in place;
   (d) manually operated means on the upper side of said plate and extending therethrough and terminating in means for compressively locking said plate and said manhole together in a fluid tight manner;
   (e) electrical sensors positioned in said annular gasket to sense that said coupling apparatus has been positioned in a fluid tight means and to prevent liquid flow if said coupling apparatus is not fluid tight;
   (f) a drop tube having one end terminating above said plate adapted and constructed to be connected to a source of liquid, the distal end extending through said plate and terminating thereinunder;
   (g) visual level indicator means attached to the upperside of said plate;
   (h) said indicator means including a rod fluidly tightly extending through said plate and terminating with a float adapted and constructed to float on said liquid in said tank of the vehicle when said tank is almost filled;
   (i) a shroud attached to said drop tube adapted and constructed to protect said float while permitting access of said liquid to said float;
   wherein said visual level indicator means includes said rod having a visible top portion and a tubular sight tube which terminates in a housing having mounted thereon a normally open electric switch means adapted and constructed to be closed by the top portion of said rod when said rod is driven upwardly when the liquid level in the tank in the vehicle is to a desired level thereby preventing further delivery of said liquid.

2. The coupling means of claim 1 wherein said rod extends through a boss integral with said plate, a guide bushing threadably attached to said boss and in axial alignment with said float positioned in said float chamber, said rod extending from said float through said guide bushing, the upper end of said rod providing indicating means positioned in a tubular housing having a cap attached thereto, a spring concentrically disposed relative to said rod in said guide bushing cooperative with said indicating means to limit the downward movement thereof.

3. The apparatus as claimed in claim 2 wherein said tubular housing positioned above said boss includes a sight opening and a seal cap positioned at the top thereof.

4. The apparatus as claimed in claim 2 wherein said tubular housing is transparent throughout its length and said indicator is brightly colored.

* * * * *